United States Patent
Sakaguchi

(10) Patent No.: US 12,115,988 B2
(45) Date of Patent: Oct. 15, 2024

(54) VEHICLE CONTROL DEVICE

(71) Applicant: TOYOTA JIDOSHA KABUSHIKI KAISHA, Toyota (JP)

(72) Inventor: Eiji Sakaguchi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/549,240

(22) Filed: Dec. 13, 2021

(65) Prior Publication Data

US 2022/0097699 A1  Mar. 31, 2022

Related U.S. Application Data

(63) Continuation of application No. 16/174,888, filed on Oct. 30, 2018, now Pat. No. 11,225,251.

(30) Foreign Application Priority Data

Nov. 6, 2017 (JP) ................... 2017-213933

(51) Int. Cl.
  *G08G 1/09* (2006.01)
  *B60W 30/17* (2020.01)
  *B60W 30/18* (2012.01)
  *G06V 20/58* (2022.01)

(52) U.S. Cl.
  CPC ...... *B60W 30/17* (2013.01); *B60W 30/18154* (2013.01); *G06V 20/58* (2022.01); *G06V 20/584* (2022.01); *B60W 2554/801* (2020.02); *B60W 2554/804* (2020.02); *B60W 2555/60* (2020.02)

(58) Field of Classification Search
  CPC ........... B60W 30/17; B60W 30/18154; B60W 2554/801; G06V 20/58; G06V 20/584; G08G 1/0104; G08G 1/0145; G08G 1/01; G08G 1/095
  See application file for complete search history.

(56) References Cited

U.S. PATENT DOCUMENTS

| | | |
|---|---|---|
| 2014/0222280 A1 | 8/2014 | Salomonsson et al. |
| 2017/0249848 A1 | 8/2017 | Niino et al. |
| 2017/0361841 A1 | 12/2017 | Kojo |

(Continued)

FOREIGN PATENT DOCUMENTS

| | | |
|---|---|---|
| JP | 2007-58631 A | 3/2007 |
| JP | 2008-207729 A | 9/2008 |

(Continued)

*Primary Examiner* — Dalena Tran
(74) *Attorney, Agent, or Firm* — Sughrue Mion, PLLC

(57) ABSTRACT

The vehicle control device includes a start determination unit configured to determine whether or not the inter-vehicle distance between the preceding vehicle and the host vehicle has become equal to or greater than a start threshold greater in value than the stop threshold, and a vehicle control unit configured to start the host vehicle based on a preset speed profile after the start determination unit determines that the inter-vehicle distance between the preceding vehicle and the host vehicle is equal to or greater than the start threshold and maintain the stopped state of the host vehicle until the start determination unit determines that the inter-vehicle distance between the preceding vehicle and the host vehicle is equal to or greater than the start threshold after the preceding vehicle and the host vehicle stop.

9 Claims, 5 Drawing Sheets

(56) References Cited

U.S. PATENT DOCUMENTS

2018/0038952 A1    2/2018  Shokonji
2019/0171204 A1*  6/2019  Jang ..................... B60W 30/14
2020/0240342 A1*  7/2020  Miyagawa .............. F02D 41/10

FOREIGN PATENT DOCUMENTS

| JP | 200931873 A | 2/2009 |
| --- | --- | --- |
| JP | 2009-184502 A | 8/2009 |
| JP | 2010238247 A | 10/2010 |
| JP | 2010250540 A | 11/2010 |
| JP | 201170299 A | 4/2011 |
| JP | 2016134034 A | 7/2016 |
| JP | 201787784 A | 5/2017 |
| JP | 2017-182297 A | 10/2017 |

\* cited by examiner

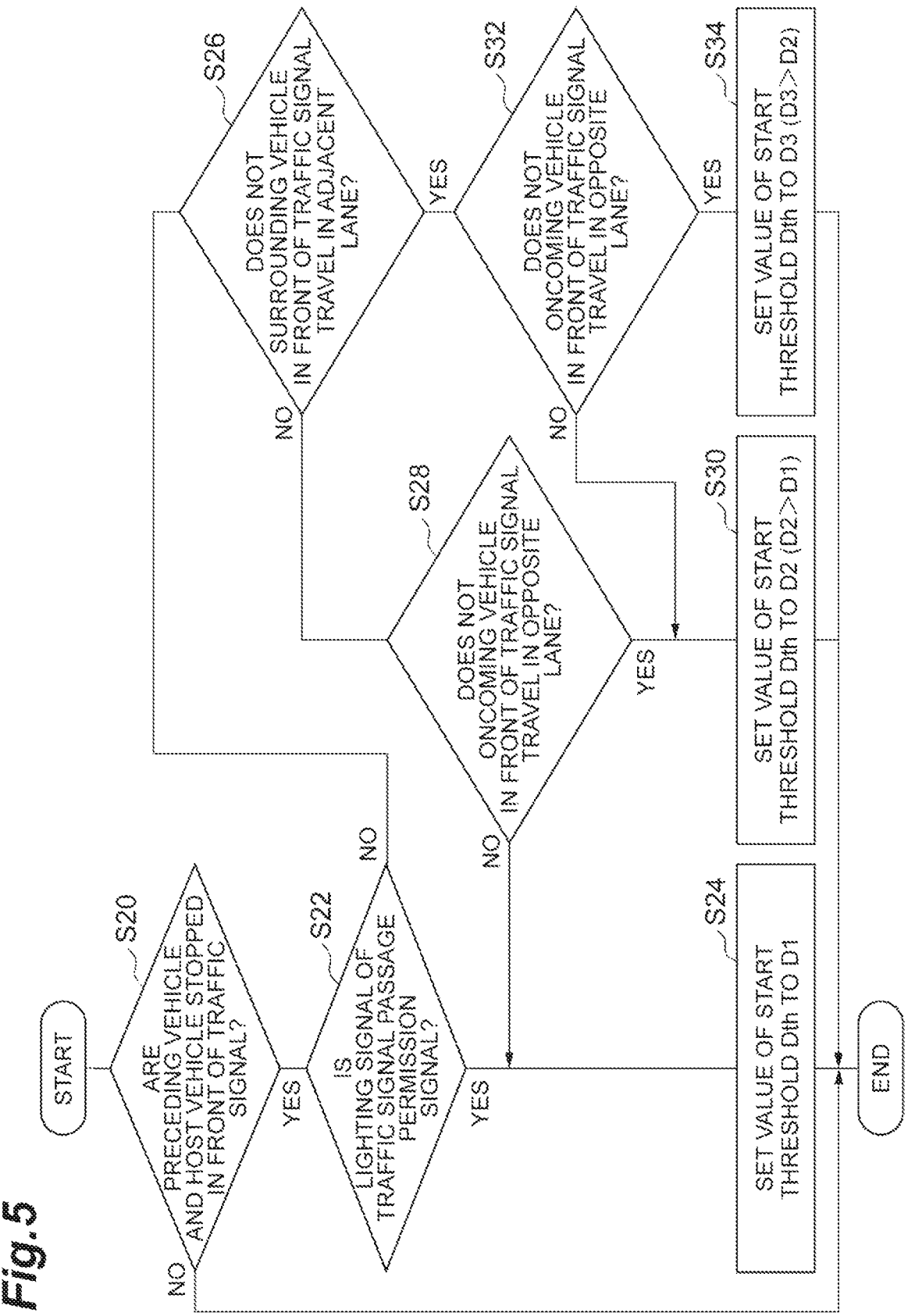

VEHICLE CONTROL DEVICE

CROSS-REFERENCE TO RELATED APPLICATION

This application is a continuation of U.S. application Ser. No. 16/174,888 filed Oct. 30, 2018, which claims the benefit of priority from Japanese Patent Application No. 2017-213933, filed Nov. 6, 2017, the entire contents of which are incorporated herein by reference.

TECHNICAL FIELD

The present disclosure relates to a vehicle control device starting a vehicle.

BACKGROUND

In the related art, Japanese Unexamined Patent Publication No. 2017-87784 is known as technical literature relating to a device starting a vehicle. Japanese Unexamined Patent Publication No. 2017-87784 discloses a driving support system allowing a host vehicle to perform creep traveling when a preceding vehicle starts and the inter-vehicle distance between the preceding vehicle and the host vehicle has become equal to or greater than a predetermined distance after the host vehicle is stopped with congestion detected.

SUMMARY

Stop control is known as control for automatically stopping the host vehicle when the inter-vehicle distance between the preceding vehicle and the host vehicle has become equal to or less than stop threshold as a result of stopping of the preceding vehicle. It is conceivable to use the stop control and the start control for the host vehicle in combination with each other. However, a simple combination between the stop control and the start control may cause, for instance, the host vehicle to repeatedly start and stop similarly to the preceding vehicle when the preceding vehicle repeats minute start (slight forward movement) and stop, and thus there is room for improvement.

Desired in this technical field in this regard is a vehicle control device with which a host vehicle can be appropriately started and stopped in accordance with the inter-vehicle distance between the host vehicle and a preceding vehicle.

An aspect of the present disclosure for solving the above problem relates to a vehicle control device stopping a host vehicle when an inter-vehicle distance between the host vehicle and a stopped preceding vehicle has become equal to or less than a stop threshold. The vehicle control device includes a start determination unit configured to determine whether or not the inter-vehicle distance between the preceding vehicle and the host vehicle has become equal to or greater than a start threshold greater in value than the stop threshold as a result of starting of the preceding vehicle , when the preceding vehicle and the host vehicle are stopped, and a vehicle control unit configured to start the host vehicle based on a preset speed profile after the start determination unit determines that the inter-vehicle distance between the preceding vehicle and the host vehicle is equal to or greater than the start threshold and maintain the stopped state of the host vehicle until the start determination unit determines that the inter-vehicle distance between the preceding vehicle and the host vehicle is equal to or greater than the start threshold after the preceding vehicle and the host vehicle stop.

In the vehicle control device according to the aspect of the present disclosure, the host vehicle is stopped when the inter-vehicle distance between the stopped preceding vehicle and the host vehicle has become equal to or less than the stop threshold and the stopped state of the host vehicle is maintained until the inter-vehicle distance between the preceding vehicle and the host vehicle becomes equal to or greater than the start threshold greater in value than the stop threshold after starting of the preceding vehicle. Accordingly, the host vehicle starting and stopping to follow those of the preceding vehicle when the preceding vehicle minutely starts and stops can be suppressed compared to when the stop threshold and the start threshold are equal values, and thus start and stop of the host vehicle in accordance with the inter-vehicle distance between the preceding vehicle and the host vehicle can be appropriately performed.

The vehicle control device according to the aspect of the present disclosure may further include a traffic signal determination unit configured to determine whether or not a lighting signal of a traffic signal is a passage permission signal when the preceding vehicle and the host vehicle are stopped in front of the traffic signal. The start determination unit may be configured to set the value of the start threshold larger when the traffic signal determination unit does not determine that the lighting signal of the traffic signal is the passage permission signal than when the traffic signal determination unit determines that the lighting signal of the traffic signal is the passage permission signal.

The vehicle control device according to the aspect of the present disclosure may further include a non-host vehicle situation determination unit configured to determine whether or not a surrounding vehicle in front of a traffic signal travels in an adjacent lane having the same progress direction as a traveling lane of the host vehicle when the preceding vehicle and the host vehicle are stopped in front of the traffic signal. The start determination unit may be configured to set the value of the start threshold larger when the non-host vehicle situation determination unit determines that the surrounding vehicle does not travel than when the non-host vehicle situation determination unit determines that the surrounding vehicle travels.

The vehicle control device according to the aspect of the present disclosure may further include a non-host vehicle situation determination unit configured to determine whether or not an oncoming vehicle in front of a traffic signal of an opposite lane travels in the opposite lane with respect to a traveling lane of the host vehicle when the preceding vehicle and the host vehicle are stopped in front of a traffic signal. The start determination unit may be configured to set the value of the start threshold larger when the non-host vehicle situation determination unit determines that the oncoming vehicle does not travel than when the non-host vehicle situation determination unit determines that the oncoming vehicle travels.

As described above, with the vehicle control device according to the aspect of the present disclosure, a host vehicle can be appropriately started and stopped in accordance with the inter-vehicle distance between the host vehicle and a preceding vehicle.

BRIEF DESCRIPTION OF THE DRAWINGS

FIG. 5 is a flowchart illustrating start threshold setting processing.

DETAILED DESCRIPTION

Hereinafter, an example of the present disclosure will be described with reference to accompanying drawings.

Figure 1:
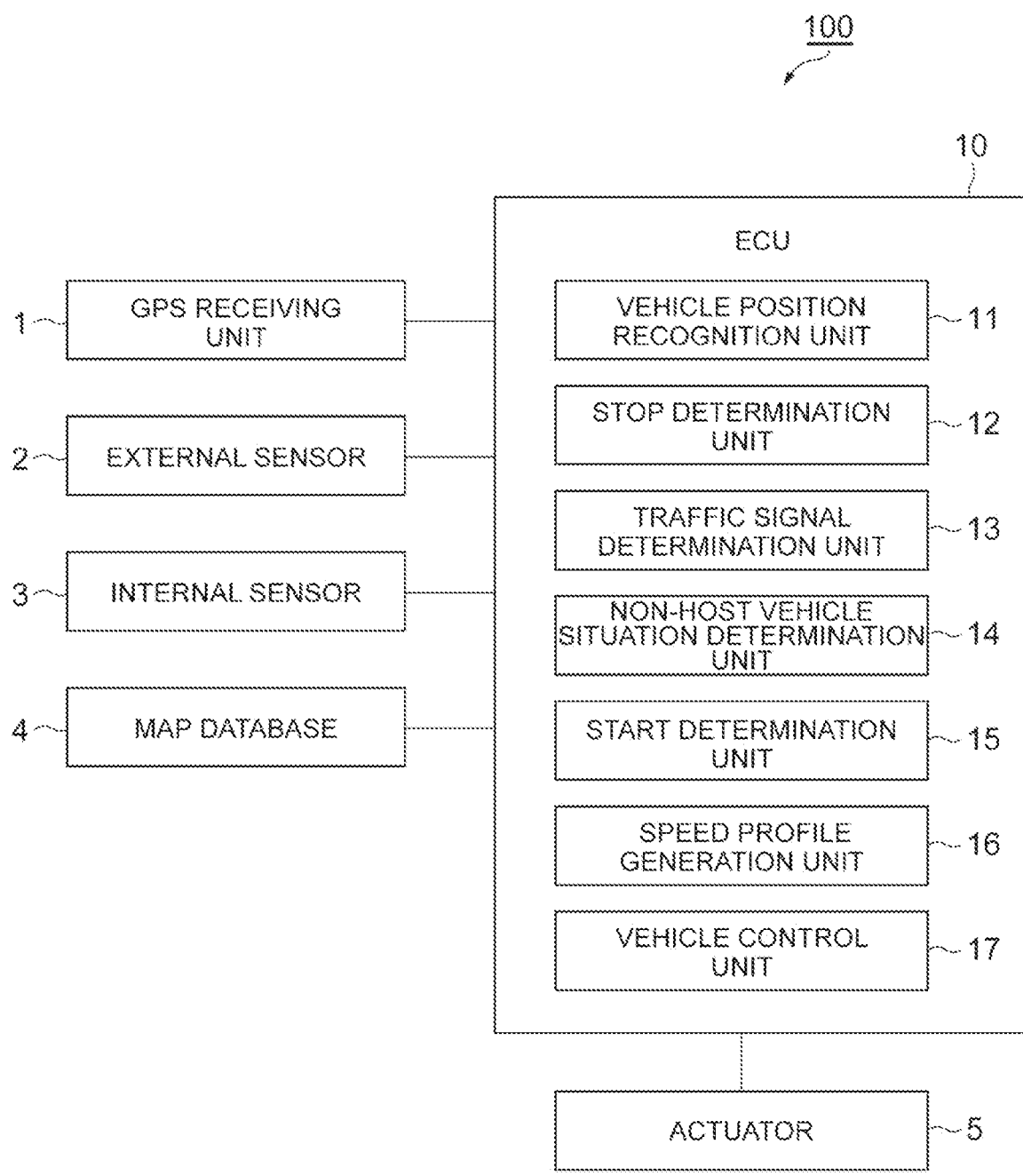
FIG. 1 is a block diagram illustrating a vehicle control device according to an example.

A vehicle control device 100 illustrated in FIG. 1 is mounted in a vehicle (host vehicle) such as a passenger car and controls traveling of the host vehicle. The vehicle control device 100 performs start control and stop control on the host vehicle based on the inter-vehicle distance between the host vehicle and a preceding vehicle traveling right ahead of the host vehicle. The start control and the stop control for the host vehicle may also be executed as a part of an autonomous driving function for autonomous vehicle traveling.

Configuration of Vehicle Control Device

The configuration of the vehicle control device 100 will be described below with reference to accompanying drawings. As illustrated in FIG. 1, the vehicle control device 100 is provided with an electronic control unit [ECU] 10 controlling traveling of the host vehicle. The ECU 10 is an electronic control unit that has a central processing unit [CPU], a read only memory [ROM], a random access memory [RAM], and the like. The ECU 10 executes various types of vehicle control by loading a program stored in the ROM into the RAM and executing the program with the CPU. A plurality of electronic control units may constitute the ECU 10 as well.

A GPS receiving unit 1, an external sensor 2, an internal sensor 3, a map database 4, and an actuator 5 are connected to the ECU 10.

The GPS receiving unit 1 measures the position of the host vehicle (such as the latitude and the longitude of the host vehicle) by receiving signals from at least three GPS satellites. The GPS receiving unit 1 transmits measured positional information regarding the host vehicle to the ECU 10.

The external sensor 2 is detection equipment detecting a situation around the host vehicle. The external sensor 2 includes at least one of a camera and a radar sensor.

The camera is imaging equipment imaging the external situation around the host vehicle. The camera is disposed on the back side of the windshield of the host vehicle. The camera transmits imaging information related to the external situation regarding the host vehicle to the ECU 10. The camera may be a monocular camera or may be a stereo camera. The stereo camera has two imaging units that are placed to reproduce a binocular disparity. Depth direction information is also included in the imaging information of the stereo camera.

The radar sensor is detection equipment detecting obstacles around the host vehicle by using radio waves (such as millimeter waves) or light. The radar sensor includes, for instance, a millimeter wave radar device or a light detection and ranging [LIDAR] device. The radar sensor detects the obstacles by transmitting the radio waves or the light to the surroundings of the host vehicle and receiving the radio waves or the light reflected by the obstacles. The radar sensor transmits detected obstacle information to the ECU 10. The obstacles include moving obstacles such as pedestrians, bicycles, and non-host vehicles as well as fixed obstacles such as guardrails and buildings.

The internal sensor 3 is detection equipment detecting the traveling state of the host vehicle. The internal sensor 3 includes a vehicle speed sensor, an acceleration sensor, and a yaw rate sensor. The vehicle speed sensor is a detector that detects the speed of the host vehicle. A vehicle wheel speed sensor that is disposed with respect to a vehicle wheel of the host vehicle, a drive shaft rotating integrally with the vehicle wheel, or the like and detects the rotation speed of the vehicle wheel is used as the vehicle speed sensor. The vehicle speed sensor transmits detected vehicle speed information (vehicle wheel speed information) to the ECU 10.

The acceleration sensor is a detector that detects the acceleration of the host vehicle. The acceleration sensor includes, for instance, a longitudinal acceleration sensor detecting the acceleration of the host vehicle in a longitudinal direction and a lateral acceleration sensor detecting the lateral acceleration of the host vehicle. The acceleration sensor transmits, for instance, acceleration information regarding the host vehicle to the ECU 10. The yaw rate sensor is a detector that detects the yaw rate (rotation angular velocity) around the vertical axis of the center of gravity of the host vehicle. A gyro sensor or the like can be used as the yaw rate sensor. The yaw rate sensor transmits detected yaw rate information regarding the host vehicle to the ECU 10.

The map database 4 is a database in which map information is stored. The map database 4 is formed within, for instance, a hard disk drive [HDD] that is mounted in the host vehicle. The map information includes, for instance, positional information regarding roads (lane-specific positional information), road shape information (such as the types of curves and linear sections and curvatures), and positional information regarding junctions and intersection points. The map information may also include positional information regarding traffic signals and information on lanes corresponding to traffic signals.

The actuator 5 is a device that is used for host vehicle control. The actuator 5 includes at least a drive actuator, a brake actuator, and a steering actuator. The drive actuator controls the drive force of the host vehicle by controlling the amount of air supply to an engine (throttle opening degree) in accordance with a control signal from the ECU 10. When the host vehicle is a hybrid vehicle, the drive force is controlled by a control signal from the ECU 10 being input to a motor as a power source as well as by means of the amount of air supply to an engine. When the host vehicle is an electric vehicle, the drive force is controlled by a control signal from the ECU 10 being input to a motor as a power source. The motors as a power source in these cases constitute the actuator 5.

The brake actuator controls a brake system in accordance with a control signal from the ECU 10 and controls a braking force given to the vehicle wheel of the host vehicle. A hydraulic brake system or the like can be used as the brake system. The steering actuator controls, in accordance with a control signal from the ECU 10, driving of an assist motor that controls a steering torque in an electric power steering system. In this manner, the steering actuator controls the steering torque of the host vehicle.

The functional configuration of the ECU 10 will be described below. The ECU 10 has a vehicle position recognition unit 11, a stop determination unit 12, a traffic signal determination unit 13, a non-host vehicle situation determination unit 14, a start determination unit 15, a speed profile generation unit 16, and a vehicle control unit 17.

The vehicle position recognition unit 11 recognizes the position of the host vehicle on a map based on the positional information of the GPS receiving unit 1 and the map information of the map database 4. In addition, the vehicle position recognition unit 11 recognizes the position of the host vehicle with simultaneous localization and mapping [SLAM] technology by using the detection result of the external sensor 2 and the positional information included in the map information of the map database 4 and related to fixed obstacles such as an electric pole. The vehicle position recognition unit 11 also recognizes a traveling lane in which the host vehicle travels. Alternatively, the vehicle position recognition unit 11 may recognize the position of the host vehicle on the map by a known method.

The stop determination unit 12 determines whether or not the inter-vehicle distance between the host vehicle and a stopped preceding vehicle has become equal to or less than a stop threshold Ds during traveling of the host vehicle. The stop threshold Ds is a preset value. The value of the stop threshold Ds may vary with the vehicle speed of the host vehicle or another parameter. The stop determination unit 12 is capable of recognizing the inter-vehicle distance between the host vehicle and the stopped preceding vehicle based on the detection result of the external sensor 2.

The traffic signal determination unit 13 determines whether or not the lighting signal of a traffic signal is a passage permission signal when the preceding vehicle and the host vehicle are stopped in front of the traffic signal. Being in front of the traffic signal can be regarded as being within a first distance from the traffic signal or a reference point corresponding to the reference of the traffic signal (such as a temporary stop line and an intersection point). The first distance is a distance that has a preset value. The passage permission signal is a signal for vehicle passage permission (such as a blue signal).

For instance, the traffic signal determination unit 13 determines whether or not the preceding vehicle and the host vehicle are stopped in front of the traffic signal based on the traffic signal-related positional information included in the map information of the map database 4, the position of the host vehicle on the map recognized by the vehicle position recognition unit 11, the detection result of the external sensor 2, and the detection result of the internal sensor 3 (detection result of the vehicle speed sensor).

After the traffic signal determination unit 13 determines that the preceding vehicle and the host vehicle are stopped in front of the traffic signal, the traffic signal determination unit 13 determines whether or not the lighting signal of the traffic signal is the passage permission signal based on the detection result of the external sensor 2 (imaged captured by the camera). The traffic signal determination unit 13 does not determine that the lighting signal of the traffic signal is the passage permission signal when the lighting state of the traffic signal is a passage prohibition signal (such as a red signal) or a transition signal (such as a yellow signal) or when the lighting state of the traffic signal is unclear. The transition signal is lit during a transition from the passage permission signal to the passage prohibition signal. The transition signal is optional.

The traffic signal determination unit 13 may perform the above-described determination by acquiring information on the lighting signal of the traffic signal by means of communication with a wireless network (such as the Internet and an optical beacon) via communication equipment of the host vehicle.

When the preceding vehicle and the host vehicle are stopped in front of the traffic signal, the non-host vehicle situation determination unit 14 determines whether or not a surrounding vehicle in front of the traffic signal travels in an adjacent lane that has the same progress direction as the traveling lane of the host vehicle. The adjacent lane that has the same progress direction as the traveling lane of the host vehicle means that a right turn-only adjacent lane and the like are not included when the progress direction of the traveling lane of the host vehicle is straight ahead.

Regarding the surrounding vehicle determination, being in front of the traffic signal can be regarded as being within a second distance from the traffic signal or the reference point corresponding to the reference of the traffic signal (such as the temporary stop line and the intersection point). The second distance is a preset distance. The second distance may be equal to or different from the first distance for determining whether or not the host vehicle is stopped in front of the traffic signal.

The non-host vehicle situation determination unit 14 recognizes the presence or absence of the adjacent lane that has the same progress direction as the traveling lane based on the map information of the map database 4 and the position of the host vehicle on the map recognized by the vehicle position recognition unit 11. The non-host vehicle situation determination unit 14 determines whether or not the surrounding vehicle in front of the traffic signal travels in the adjacent lane based on the detection result of the external sensor 2, the map information, and the position of the host vehicle on the map.

The non-host vehicle situation determination unit 14 determines that the surrounding vehicle in front of the traffic signal does not travel in the adjacent lane when the adjacent lane that has the same progress direction as the traveling lane is absent or when no surrounding vehicle is present on the adjacent lane. The non-host vehicle situation determination unit 14 may also determine that the surrounding vehicle does not travel, even if the surrounding vehicle is present, when the vehicle speed of the surrounding vehicle is equal to or less than a first predetermined value (such as 3 km/h). In addition, the non-host vehicle situation determination unit 14 may determine that the surrounding vehicle does not travel when the vehicle speed of the surrounding vehicle is equal to or less than a second predetermined value (such as 10 km/h) and the deceleration of the surrounding vehicle is equal to or greater than a predetermined value.

In addition, when the preceding vehicle and the host vehicle are stopped in front of the traffic signal, the non-host vehicle situation determination unit 14 determines whether or not an oncoming vehicle in front of the traffic signal of an opposite lane travels in the opposite lane with respect to the traveling lane of the host vehicle. The non-host vehicle situation determination unit 14 is capable of performing the above-described determination based on the detection result of the external sensor 2, the map information, and the position of the host vehicle on the map.

The opposite lane with respect to the traveling lane of the host vehicle is a lane with a progress direction facing the progress direction of the traveling lane of the host vehicle. Being in front of the traffic signal of the opposite lane can be regarded as being within a third distance from the traffic signal of the opposite lane or a reference point corresponding to the reference of the traffic signal (such as a temporary stop line and an intersection point). The third distance is a preset distance. The third distance may be equal to or different from the first distance. In addition, the third distance may be equal to or different from the second distance.

The non-host vehicle situation determination unit 14 determines that the oncoming vehicle in front of the traffic signal does not travel in the opposite lane when no opposite lane is present with respect to the traveling lane (including when no opposite lane can be detected by the external sensor 2 in a tunnel or the like) or when no oncoming vehicle is present on the opposite lane. The non-host vehicle situation determination unit 14 may also determine that the oncoming vehicle does not travel, even if the oncoming vehicle is present, when the vehicle speed of the oncoming vehicle is equal to or less than a third predetermined value (such as 3 km/h). In addition, the non-host vehicle situation determination unit 14 may determine that the oncoming vehicle does not travel when the vehicle speed of the oncoming vehicle is equal to or less than a fourth predetermined value (such as 10 km/h) and the deceleration of the oncoming vehicle is equal to or greater than a predetermined value.

When the preceding vehicle and the host vehicle are stopped, the start determination unit 15 determines whether or not the inter-vehicle distance between the preceding vehicle and the host vehicle has become equal to or greater than a start threshold Dth after starting of the preceding vehicle. The start threshold Dth is a threshold preset as a value greater than the stop threshold Ds. The value of the start threshold Dth may be changed insofar as the value is greater than the stop threshold Ds under the same conditions. The start determination unit 15 is capable of performing the above-described determination based on the detection result of the external sensor 2.

The start determination unit 15 determines whether or not the inter-vehicle distance has become equal to or greater than the start threshold every time the preceding vehicle and the host vehicle are stopped due to congestion in the middle of a road, a temporary stop line with no traffic signal, and so on, and the determination is not limited to when the preceding vehicle and the host vehicle are stopped in front of the traffic signal.

In addition, the start determination unit 15 sets the value of the start threshold larger when the preceding vehicle and the host vehicle are stopped in front of the traffic signal and the traffic signal determination unit 13 does not determine that the lighting signal of the traffic signal is the passage permission signal than when the traffic signal determination unit 13 determines that the lighting signal of the traffic signal is the passage permission signal.

The start determination unit 15 sets the value of the start threshold larger when the preceding vehicle and the host vehicle are stopped in front of the traffic signal and the non-host vehicle situation determination unit 14 determines that the surrounding vehicle in front of the traffic signal does not travel in the adjacent lane that has the same progress direction as the traveling lane of the host vehicle than when the non-host vehicle situation determination unit 14 determines that the surrounding vehicle travels.

When a plurality of surrounding vehicles follow one after another in the adjacent lane, the start determination unit 15 may set the start threshold based on the leading surrounding vehicle, which is the surrounding vehicle that is closest to the traffic signal. In this case, the non-host vehicle situation determination unit 14 determines whether or not the leading surrounding vehicle travels based on the detection result of the external sensor 2, the map information, and the position of the host vehicle on the map. After the non-host vehicle situation determination unit 14 determines that the leading surrounding vehicle does not travel, the start determination unit 15 sets the value of the start threshold larger than after the non-host vehicle situation determination unit 14 determines that the leading surrounding vehicle travels. At this time, the presence or absence of traveling of a surrounding vehicle following the leading surrounding vehicle does not have to be used for the start threshold setting.

When there are a plurality of adjacent lanes with the same progress direction as the traveling lane of the host vehicle and none of the leading surrounding vehicles in the respective adjacent lanes travels, the start determination unit 15 may set the value of the start threshold larger than when any one of the leading surrounding vehicles in the respective adjacent lanes travels.

In addition, the start determination unit 15 sets the value of the start threshold larger when the preceding vehicle and the host vehicle are stopped in front of the traffic signal and the non-host vehicle situation determination unit 14 determines that the oncoming vehicle in front of the traffic signal of the opposite lane does not travel in the opposite lane with respect to the traveling lane of the host vehicle than when the non-host vehicle situation determination unit 14 determines that the oncoming vehicle travels.

When a plurality of oncoming vehicles follow one after another in the opposite lane, the start determination unit 15 may set the start threshold based on the leading oncoming vehicle, which is the oncoming vehicle that is closest to the traffic signal of the opposite lane. In this case, the non-host vehicle situation determination unit 14 determines whether or not the leading oncoming vehicle travels based on the detection result of the external sensor 2, the map information, and the position of the host vehicle on the map. After the non-host vehicle situation determination unit 14 determines that the leading oncoming vehicle does not travel, the start determination unit 15 sets the value of the start threshold larger than after the non-host vehicle situation determination unit 14 determines that the leading oncoming vehicle travels. At this time, the presence or absence of traveling of an oncoming vehicle following the leading oncoming vehicle does not have to be used for the start threshold setting.

When there are a plurality of opposite lanes and none of the leading oncoming vehicles in the respective opposite lanes travels, the start determination unit 15 may set the value of the start threshold larger than when any one of the leading oncoming vehicles in the respective opposite lanes travels.

When the preceding vehicle and the host vehicle are stopped in front of the traffic signal and the vehicle that is closest to the traffic signal in the traveling lane of the host vehicle is not the preceding vehicle (preceding vehicle right ahead of the host vehicle), the start determination unit 15 may set the start threshold based on the leading vehicle that is closest to the traffic signal in the traveling lane. In this case, the start determination unit 15 sets the value of the start threshold larger when a determination is made that the leading vehicle does not travel than when a determination is made that the leading vehicle travels. The presence or absence of traveling of the leading vehicle can be recognized by the detection result of the external sensor 2.

The speed profile generation unit 16 generates the speed profile of the host vehicle. The speed profile is a vehicle speed plan used for host vehicle speed control. The speed profile includes a target vehicle speed that depends on the position of the host vehicle.

The generation of the speed profile will be described in detail below. The speed profile generation unit 16 generates the speed profile based on the surrounding environment regarding the host vehicle recognized from the detection result of the external sensor 2, the traveling state of the host vehicle recognized from the detection result of the internal sensor 3, the map information of the map database 4, and the position of the host vehicle on the map recognized by the vehicle position recognition unit 11.

The speed profile generation unit 16 calculates each of a preset upper limit speed, the speed limit at a speed limit point included in the map information, a curvature corresponding speed that depends on the curvature of the traveling lane of the vehicle, and an obstacle situation speed that depends on the situation of a moving obstacle around the vehicle. The preset upper limit speed is an upper limit speed set with respect to a vehicle traveling lane or a vehicle traveling section instead of a point. For instance, the legal maximum speed set in the vehicle traveling lane or the vehicle traveling section can be adopted as the preset upper limit speed. Also, any set maximum speed may be adopted instead of the legal maximum speed determined in accordance with the traffic rules of a country or a region.

Specifically, the speed profile generation unit 16 sets the legal maximum speed set in the vehicle traveling lane or the vehicle traveling section as the preset upper limit speed. In addition, the speed profile generation unit 16 recognizes the speed limit at the speed limit point included in the map information based on the position of the vehicle on the map and the map information. The speed limit point is a speed-limited point such as a temporary stop line and a crosswalk sign. For instance, the speed limit at the temporary stop line can be 0 km/h and the speed limit at the crosswalk sign can be 20 km/h. The speed limit may be included in the map information or may be stored in a database other than the map database 4 (such as a traffic rule map database).

The speed profile generation unit 16 calculates the curvature corresponding speed that depends on the curvature of the vehicle traveling lane based on the position of the vehicle on the map and the map information. For instance, the speed profile generation unit 16 calculates the curvature corresponding speed from the curvature by using a curvature-vehicle speed map in which the curvature and the vehicle speed are associated with each other in advance.

The speed profile generation unit 16 calculates the obstacle situation speed that depends on the situation of the moving obstacle around the vehicle based on the surrounding environment regarding the host vehicle recognized from the detection result of the external sensor 2. For instance, the speed profile generation unit 16 adopts the vehicle speed of a preceding vehicle for the upper limit speed as the obstacle situation speed during traveling of the preceding vehicle. In addition, the speed profile generation unit 16 is capable of calculating the obstacle situation speed that depends on the situation of a moving obstacle around the vehicle by various known methods.

The speed profile generation unit 16 sets a target vehicle speed equal to or less than the lowest one of the upper limit speed, the speed limit, the curvature corresponding speed, and the obstacle situation speed for each of set positions preset along the traveling lane. The set positions preset along the traveling lane are positions set at regular intervals on the traveling lane. The target vehicle speed can be, for instance, equal in value to the lowest speed. In the case of autonomous driving, the set position can be set along a preset target route.

The speed profile generation unit 16 generates the speed profile by interpolating the target vehicle speed for each set position by preset smooth interpolation processing. Spline interpolation or the like can be used for the smooth interpolation processing.

The speed profile generation unit 16 generates speed profiles for host vehicle start and stop. The speed profile at a time of start is, for instance, generated for acceleration faster than creep torque-based creep traveling. The speed profile generation unit 16 may also adopt various known speed profile generation methods not limited to the above-described speed profile generation method.

The vehicle control unit 17 performs the stop control on the host vehicle after the stop determination unit 12 determines that the inter-vehicle distance between the host vehicle and the stopped preceding vehicle is equal to or less than the stop threshold Ds. The vehicle control unit 17 decelerates and stops the host vehicle by transmitting a control signal to the actuator 5 based on the speed profile.

The vehicle control unit 17 performs the start control on the host vehicle after the start determination unit 15 determines that the inter-vehicle distance between the host vehicle and the preceding vehicle is equal to or greater than the start threshold. The vehicle control unit 17 starts the host vehicle by transmitting a control signal to the actuator 5 based on the speed profile. The vehicle control unit 17 maintains the stopped state of the host vehicle until the start determination unit 15 determines that the inter-vehicle distance between the preceding vehicle and the host vehicle is equal to or greater than the start threshold Dth when the preceding vehicle and the host vehicle are stopped.

Figure 2:
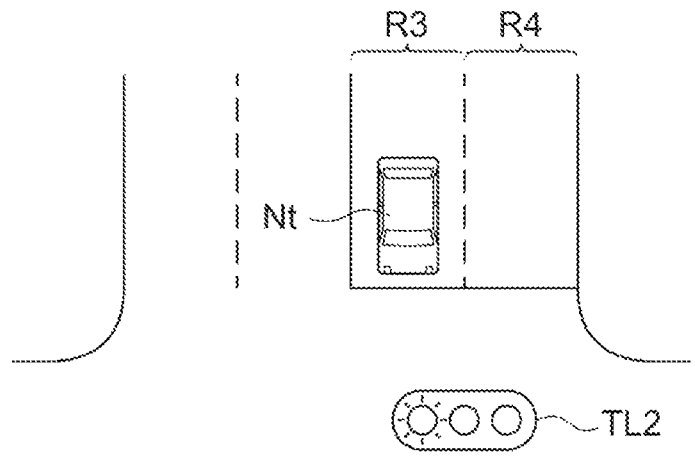
FIG. 2 is a plan view illustrating a situation in which a preceding vehicle and a host vehicle are stopped in front of an intersection point.
Figure 2:
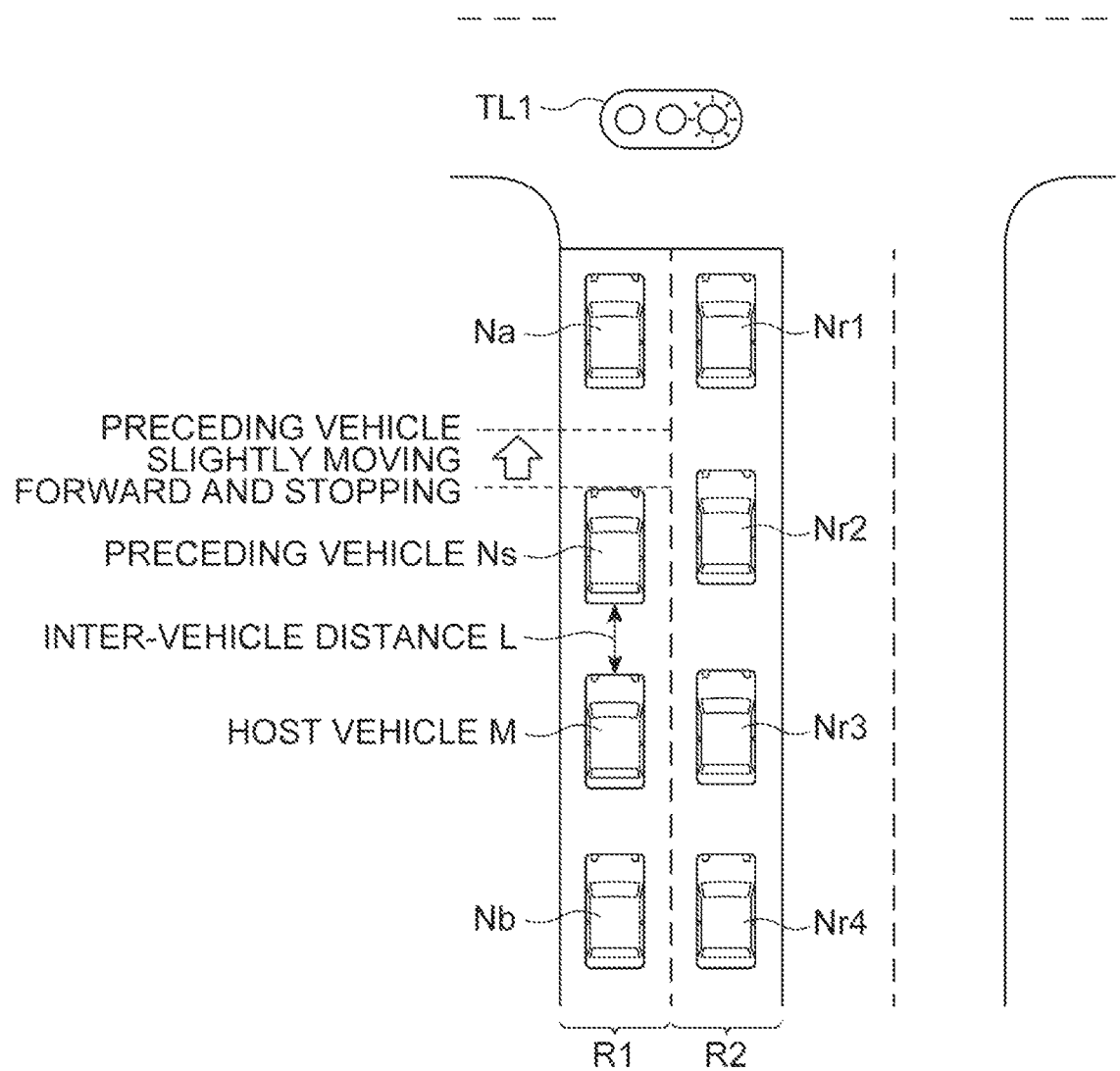

FIG. 2 is a plan view illustrating a situation in which the preceding vehicle and the host vehicle are stopped in front of an intersection point. Illustrated in FIG. 2 are a host vehicle M, a preceding vehicle Ns, an inter-vehicle distance L between the host vehicle M and the preceding vehicle Ns, a traveling lane R1 in which the host vehicle M travels, an adjacent lane R2 adjacent to the traveling lane R1, opposite lanes R3 and R4 facing the traveling lane R1, a traffic signal TL1 in front of the host vehicle M, and a traffic signal TL2 of the opposite lanes. In FIG. 2, the lighting signals of the traffic signal TL1 and the traffic signal TL2 are the passage prohibition signal (such as a red signal).

A preceding vehicle Na in front of the preceding vehicle Ns and a following vehicle Nb following the host vehicle M as well as the host vehicle M and the preceding vehicle Ns are stopped in the traveling lane R1. Surrounding vehicles Nr1 to Nr4 are stopped in the adjacent lane R2. An oncoming vehicle Nt is stopped in the opposite lane R3. In FIG. 2, the preceding vehicle Na is the leading vehicle that is closest to the traffic signal TL1 in the traveling lane R1. The surrounding vehicle Nr1 is the leading surrounding vehicle that is closest to the traffic signal TL1 in the adjacent lane R2. The oncoming vehicle Nt is the leading oncoming vehicle that is closest to the traffic signal TL2 in the opposite lane R3.

Figures 3A, 3B:
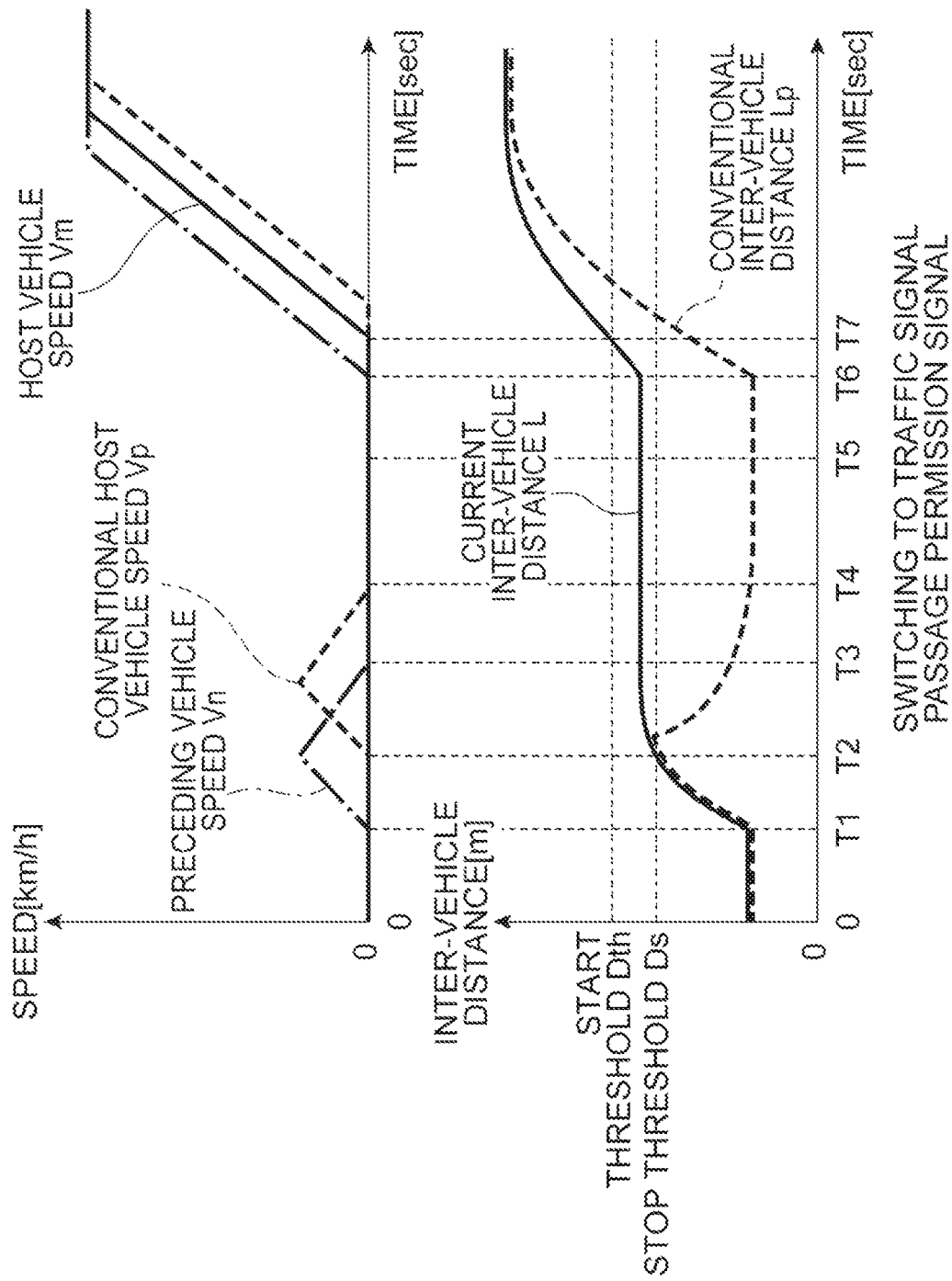
FIG. 3A is a graph showing how the speed of the preceding vehicle and the speed of the host vehicle change with time.
FIG. 3B is a graph showing how the inter-vehicle distance between the preceding vehicle and the host vehicle changes with time.

Conceivable in the situation illustrated in FIG. 2 is a case where the preceding vehicle Ns stops after slightly moving forward. Here, FIG. 3A is a graph showing how the speed of the preceding vehicle Ns and the speed of the host vehicle M change with time. The vertical axis in FIG. 3A represents the speeds [km/h] and the horizontal axis in FIG. 3A represents time [sec]. Illustrated in FIG. 3A are a preceding vehicle speed Vn (one-dot chain line), a conventional host vehicle speed Vp (dashed line), and a current host vehicle speed Vm (solid line). A case where the stop threshold Ds by the stop determination unit 12 and the start threshold Dth by the start determination unit 15 are equal values will be described as a conventional case.

FIG. 3B is a graph showing how the inter-vehicle distance between the preceding vehicle Ns and the host vehicle M changes with time. The vertical axis in FIG. 3B represents the inter-vehicle distance [m] and the horizontal axis in FIG. 3B represents time [sec]. Illustrated in FIG. 3B are a conventional inter-vehicle distance Lp (dashed line) and the current inter-vehicle distance L (solid line). The vertical axis shows the stop threshold Ds and the start threshold Dth.

In addition, the horizontal axis shows time points T1 to T7. The time point T1 is a time point when the preceding vehicle Ns starts. The time point T2 is a time point when the conventional host vehicle M starts to follow the preceding vehicle Ns. The time point T3 is a time point when the preceding vehicle Ns stops. The time point T4 is a time point when the conventional host vehicle M stops to follow the preceding vehicle Ns. The time point T5 is a time point when the lighting signal of the traffic signal TL1 is switched to the passage permission signal. The time point T6 is a time point when the preceding vehicle Ns starts. The time point T7 is a time point when the current host vehicle M starts to follow the preceding vehicle Ns.

When the stop threshold Ds and the start threshold Dth are equal values as in the conventional case in the situation illustrated in FIG. 2, the host vehicle M starts as a result of immediate following once the preceding vehicle Ns slightly moves forward and the inter-vehicle distance Lp between the preceding vehicle Ns and the host vehicle M exceeds the stop threshold Ds (refer to FIG. 3B). Once the preceding vehicle Ns subsequently decelerates, the conventional host vehicle M also decelerates and stops as illustrated in FIG. 3A. As a result, needless start and stop of the host vehicle M occur.

In the vehicle control device 100, in contrast, the start threshold Dth is greater in value than the stop threshold Ds, and thus the current host vehicle M starting and stopping to follow those of the preceding vehicle Ns can be suppressed, as illustrated in FIGS. 3A and 3B, even if the preceding vehicle Ns slightly moves forward and stops. These action and effect of the vehicle control device 100 will be described in detail later.

In FIGS. 3A and 3B, there is a time difference until the host vehicle M initiates deceleration after the inter-vehicle distance L between the preceding vehicle Ns and the host vehicle M falls below the stop threshold Ds.

In addition, in FIG. 3B, a change in the value of the start threshold Dth attributable to the switching of the lighting signal of the traffic signal TL1 to the passage permission signal is not performed.

Start Determination Processing of Vehicle Control Device

Figure 4:
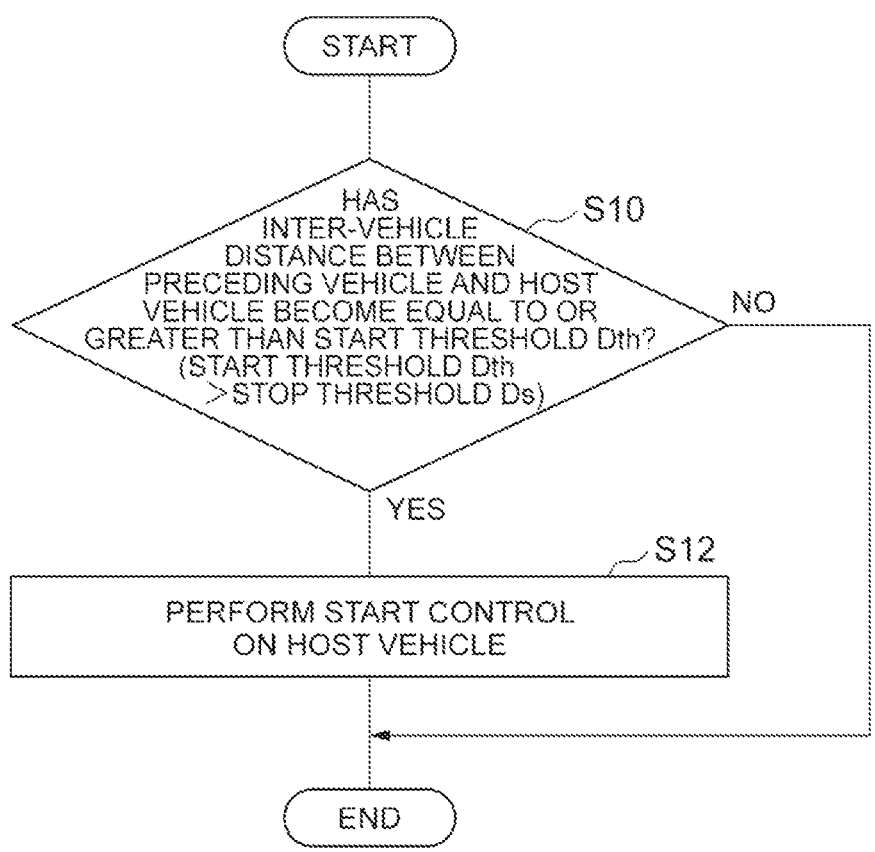
FIG. 4 is a flowchart illustrating start determination processing.

Hereinafter, start determination processing of the vehicle control device 100 according to the example will be described with reference to FIG. 4. FIG. 4 is a flowchart illustrating the start processing. The processing of the flowchart illustrated in FIG. 4 is executed when the preceding vehicle and the host vehicle are stopped. The processing of this flowchart is not limited to when the preceding vehicle and the host vehicle are stopped in front of a traffic signal.

As illustrated in FIG. 4, in S10, the start determination unit 15 of the ECU 10 of the vehicle control device 100 determines whether or not the inter-vehicle distance between the preceding vehicle and the host vehicle has become equal to or greater than the start threshold Dth after starting of the preceding vehicle. The start threshold Dth is a threshold preset as a value greater than the stop threshold Ds. The ECU 10 terminates the current processing when the start determination unit 15 does not determine that the inter-vehicle distance between the preceding vehicle and the host vehicle has become equal to or greater than the start threshold Dth (S10: NO). The ECU 10 repeats the processing from S10 after the elapse of a predetermined time. The ECU 10 proceeds to S12 when the start determination unit 15 determines that the inter-vehicle distance between the preceding vehicle and the host vehicle has become equal to or greater than the start threshold Dth (S10: YES).

In S12, the vehicle control unit 17 of the ECU 10 performs the start control on the host vehicle. The vehicle control unit 17 starts the host vehicle by transmitting a control signal to the actuator 5 based on the speed profile generated in advance. Subsequently, the ECU 10 terminates the current processing.

The speed profile may be generated when the preceding vehicle and the host vehicle stop or may be generated when the start determination unit 15 determines that the inter-vehicle distance has become equal to or greater than the start threshold Dth.

Start Threshold Setting Processing of Vehicle Control Device

Next, start threshold setting processing of the vehicle control device 100 will be described with reference to FIG. 5. FIG. 5 is a flowchart illustrating the start threshold setting processing. The processing of the flowchart illustrated in FIG. 5 is executed when, for instance, the host vehicle stops.

As illustrated in FIG. 5, in S20, the traffic signal determination unit 13 of the ECU 10 determines whether or not the preceding vehicle and the host vehicle are stopped in front of a traffic signal. The traffic signal determination unit 13 is capable of determining whether or not the preceding vehicle and the host vehicle are stopped in front of the traffic signal based on the traffic signal-related positional information included in the map information of the map database 4, the position of the host vehicle on the map recognized by the vehicle position recognition unit 11, the detection result of the external sensor 2, and the detection result of the internal sensor 3 (detection result of the vehicle speed sensor).

The ECU 10 terminates the current processing when the traffic signal determination unit 13 does not determine that the preceding vehicle and the host vehicle are stopped in front of the traffic signal (S20: NO). An initial value, for instance, is adopted as the start threshold Dth in this case. The ECU 10 proceeds to S22 when the traffic signal determination unit 13 determines that the preceding vehicle and the host vehicle are stopped in front of the traffic signal (S20: YES).

In S22, the traffic signal determination unit 13 of the ECU 10 determines whether or not the lighting signal of the traffic signal is the passage permission signal. The traffic signal determination unit 13 is capable of performing the above-described determination based on the detection result of the external sensor 2 (image captured by the camera). The ECU 10 proceeds to S24 when the traffic signal determination unit 13 determines that the lighting signal of the traffic signal is the passage permission signal (S22: YES). The ECU 10 proceeds to S26 when the traffic signal determination unit 13 does not determine that the lighting signal of the traffic signal is the passage permission signal (S22: NO).

In S24, the start determination unit 15 of the ECU 10 sets the value of the start threshold Dth to D1. Subsequently, the ECU 10 terminates the current processing.

In S26, the non-host vehicle situation determination unit 14 of the ECU 10 determines whether or not a surrounding vehicle in front of the traffic signal travels in the adjacent lane that has the same progress direction as the traveling lane of the host vehicle. The non-host vehicle situation determination unit 14 is capable of performing the above-described determination based on the detection result of the external sensor 2, the map information, and the position of the host vehicle on the map. The ECU 10 proceeds to S32 when the non-host vehicle situation determination unit 14 determines that the surrounding vehicle travels (S26: YES). The ECU 10 proceeds to S28 when the non-host vehicle situation determination unit 14 does not determine that the surrounding vehicle travels (S26: NO).

In S28, the non-host vehicle situation determination unit 14 of the ECU 10 determines whether or not an oncoming vehicle in front of the traffic signal of an opposite lane travels in the opposite lane with respect to the traveling lane of the host vehicle. The non-host vehicle situation determination unit 14 is capable of performing the above-described determination based on the detection result of the external sensor 2, the map information, and the position of the host vehicle on the map. The ECU 10 proceeds to S30 when the non-host vehicle situation determination unit 14 determines that the oncoming vehicle does not travel (S28: YES). The ECU 10 proceeds to S24 when the non-host vehicle situation determination unit 14 determines that the oncoming vehicle travels (S28: NO).

In S30, the start determination unit 15 of the ECU 10 sets the value of the start threshold Dth to D2. D2 is a value greater than D1. Subsequently, the ECU 10 terminates the current processing.

In S32, the non-host vehicle situation determination unit 14 of the ECU 10 determines whether or not the oncoming vehicle in front of the traffic signal of the opposite lane travels in the opposite lane with respect to the traveling lane of the host vehicle. S32 and S28 are the same determination processing. The ECU 10 proceeds to S30 when the non-host vehicle situation determination unit 14 determines that the oncoming vehicle travels (S32: NO). The ECU 10 proceeds to S34 when the non-host vehicle situation determination unit 14 determines that the oncoming vehicle does not travel (S32: YES).

In S34, the start determination unit 15 of the ECU 10 sets the value of the start threshold Dth to D3. D3 is a value greater than D2 and D1. Subsequently, the ECU 10 terminates the current processing.

Although the start threshold Dth is changed to the three values of D1 to D3 in the flowchart illustrated in FIG. 5, the number of the values may also be two. The vehicle control device 100 may set the value of the start threshold Dth to D1 when a determination is made that neither the surrounding vehicle nor the oncoming vehicle travels and set the value of the start threshold Dth to D2 when a determination is made that either the surrounding vehicle or the oncoming vehicle travels.

Action and Effect of Vehicle Control Device

In the vehicle control device 100 according to the example described above, the host vehicle M is stopped when the inter-vehicle distance L between the stopped preceding vehicle Ns and the host vehicle M has become equal to or less than the stop threshold Ds and the stopped state of the host vehicle M is maintained until the inter-vehicle distance L between the preceding vehicle Ns and the host vehicle M becomes equal to or greater than the start threshold Dth greater in value than the stop threshold Ds after starting of the preceding vehicle Ns. Accordingly, the host vehicle M starting and stopping to follow those of the preceding vehicle Ns when the preceding vehicle Ns minutely starts (slightly moves forward) and stops can be suppressed compared to when the stop threshold Ds and the start threshold Dth are equal values, and thus start and stop of the host vehicle M in accordance with the inter-vehicle distance L between the preceding vehicle Ns and the host vehicle M can be appropriately performed.

In other words, as illustrated in FIGS. 3A and 3B, in the vehicle control device 100, the stopped state is maintained without start, even if the preceding vehicle Ns slightly moves forward, until the inter-vehicle distance L between the preceding vehicle Ns and the host vehicle M reaches the start threshold Dth greater than the stop threshold Ds. As a result, needless start and stop of the host vehicle M can be suppressed, and thus deterioration of the drivability of the host vehicle M can be reduced. In addition, with the vehicle control device 100, a following vehicle behind the host vehicle M needlessly starting and stopping by being affected by the host vehicle M can also be suppressed, and thus deterioration of the drivability of the following vehicle is avoided.

In addition, as illustrated in FIG. 3B, in the vehicle control device 100, the host vehicle M does not follow the preceding vehicle Ns even if the preceding vehicle Ns slightly moves forward and stops, and thus the inter-vehicle distance L between the preceding vehicle Ns and the host vehicle M is maintained close to the start threshold Dth. Accordingly, as illustrated in FIG. 3A, starting of the preceding vehicle Ns can be followed earlier than in the conventional case when the lighting state of the traffic signal TL1 is switched to the passage permission signal and the preceding vehicle Ns starts, and thus the possibility of the occurrence of interruption from the adjacent lane R2 to the front of the host vehicle M can be reduced.

The additional action and effect of the vehicle control device 100 will be described below. In FIGS. 3A and 3B, a change in the value of the start threshold Dth attributable to the determination result of the traffic signal determination unit 13 and a change in the value of the start threshold Dth attributable to the detection result of the non-host vehicle situation determination unit 14 to be described below are not reflected.

In the vehicle control device 100, the value of the start threshold Dth is set larger, because of a higher possibility of re-stopping of the preceding vehicle Ns in front of the traffic signal TL1 after starting of the preceding vehicle Ns, when the traffic signal determination unit 13 does not determine that the lighting signal of the traffic signal TL1 is the passage permission signal than when the traffic signal determination unit 13 determines that the lighting signal of the traffic signal TL1 is the passage permission signal. Accordingly, the host vehicle M following minute start and stop of the preceding vehicle Ns can be appropriately suppressed. In the vehicle control device 100, the value of the start threshold Dth is set small, because of a high possibility of passage of the preceding vehicle Ns under the traffic signal TL1 after starting of the preceding vehicle Ns, when the traffic signal determination unit 13 determines that the lighting signal of the traffic signal TL1 is the passage permission signal. Accordingly, the host vehicle M can be smoothly started with starting of the preceding vehicle Ns.

In the vehicle control device 100, the value of the start threshold Dth is set larger, because of a higher possibility of re-stopping of the preceding vehicle Ns in front of the traffic signal TL1 after starting of the preceding vehicle Ns, when the non-host vehicle situation determination unit 14 determines that the surrounding vehicle Nr1 in front of the traffic signal TL1 does not travel in the adjacent lane R2 that has the same progress direction as the traveling lane R1 of the host vehicle M than when the non-host vehicle situation determination unit 14 determines that the surrounding vehicle Nr1 travels. Accordingly, the host vehicle M following minute start and stop of the preceding vehicle Ns can be appropriately suppressed.

In addition, in the vehicle control device 100, the value of the start threshold Dth is set larger, because of a higher possibility of re-stopping of the preceding vehicle Ns in front of the traffic signal after starting of the preceding vehicle Ns, when the oncoming vehicle Nt in front of the traffic signal TL1 does not travel in the opposite lane R3 than when the oncoming vehicle Nt travels. Accordingly, the host vehicle M following minute start and stop of the preceding vehicle Ns can be appropriately suppressed.

In the vehicle control device 100, the value of the start threshold Dth is set larger, because of a higher possibility of re-stopping of the preceding vehicle Ns in front of the traffic signal after starting of the preceding vehicle Ns, when the leading vehicle Na that is closest to the traffic signal TL1 in the traveling lane R1 does not travel than when the leading vehicle Na travels. Accordingly, the host vehicle M following minute start and stop of the preceding vehicle Ns can be appropriately suppressed.

Although a preferred example of the present disclosure has been described above, the present disclosure is not limited to the example described above. The present disclosure can be implemented in various forms derived from the above-described example and changed and improved based on the knowledge of those skilled in the art.

The vehicle control device 100 does not necessarily have to be provided with the traffic signal determination unit 13 and the start threshold Dth does not have to be changed in accordance with the lighting state of a traffic signal. In this case, the map information does not have to include positional information regarding traffic signals and information on lanes corresponding to traffic signals.

The vehicle control device 100 does not necessarily have to be provided with the non-host vehicle situation determination unit 14 and the start threshold Dth does not have to vary with the presence or absence of traveling of a surrounding vehicle, an oncoming vehicle, and a leading vehicle (leading vehicle in the traveling lane of the host vehicle).

Alternatively, the vehicle control device 100 may change the start threshold Dth by using at least one of the surrounding vehicle, the oncoming vehicle, and the leading vehicle. In this case, the non-host vehicle situation determination unit 14 may determine the presence or absence of traveling of at least one of the surrounding vehicle, the oncoming vehicle, and the leading vehicle. The non-host vehicle situation determination unit 14 may determine the presence or absence of traveling of at least one of the surrounding vehicle, the oncoming vehicle, and the leading vehicle by acquiring information on each vehicle by inter-vehicle communication without having to be limited to the detection result of the external sensor 2.

What is claimed is:

1. A vehicle control device configured to stop a host vehicle when an inter-vehicle distance between the host vehicle and a preceding vehicle has become equal to or less than a stop threshold, the vehicle control device comprising:
an electronic control unit (ECU) configured to:
determine whether the inter-vehicle distance between the preceding vehicle and the host vehicle has become equal to or greater than a start threshold, the start threshold being greater in value than the stop threshold, as a result of a starting of the preceding vehicle, when the preceding vehicle and the host vehicle are stopped;
start the host vehicle after the determination is made that the inter-vehicle distance between the preceding vehicle and the host vehicle is equal to or greater than the start threshold;
make a determination of a situation of a surrounding vehicle in an adjacent lane; and
set the value of the start threshold based on a result of the determination, the set value of the start threshold being larger than the stop threshold.

2. The vehicle control device according to claim 1, wherein the ECU is further configured to maintain the stopped state of the host vehicle until it is determined that the inter-vehicle distance between the preceding vehicle and the host vehicle is equal to or greater than the start threshold after the preceding vehicle and the host vehicle stop.

3. The vehicle control device according to claim 1, wherein the ECU is further configured to make a determination of a situation of the surrounding vehicle when the preceding vehicle and the host vehicle are stopped in front of a traffic signal.

4. The vehicle control device according to claim 3, wherein the surrounding vehicle is positioned in front of the traffic signal.

5. The vehicle control device according to claim 1, wherein the adjacent lane has a same progress direction as a traveling lane of the host vehicle.

6. The vehicle control device according to claim 1, wherein the ECU is further configured to make a determination of a traveling situation of the surrounding vehicle in the adjacent lane and set the value of the start threshold based on a result of the determination.

7. The vehicle control device according to claim 1, wherein the ECU is further configured to determine whether a vehicle speed of the surrounding vehicle in the adjacent lane is more than zero, and set the value of the start threshold based on a result of the determination.

8. A vehicle control device comprising:
an electronic control unit (ECU) configured to:
stop a host vehicle when an inter-vehicle distance between the host vehicle and a preceding vehicle has become equal to or less than a stop threshold;
after the preceding vehicle and the host vehicle have stopped, determine whether a surrounding vehicle detected in an adjacent lane is traveling;
while the preceding vehicle and the host vehicle are stopped, set a start threshold for starting the host vehicle based on a result of the determination, wherein the start threshold is greater in value than the stop threshold;
after the preceding vehicle starts moving and while the host vehicle remains stopped, determine whether the inter-vehicle distance between the preceding vehicle and the host vehicle has become equal to or greater than the start threshold; and
start the host vehicle after the determination is made that the inter-vehicle distance between the preceding vehicle and the host vehicle is equal to or greater than the start threshold.

9. The vehicle control device according to claim 8, wherein the ECU is further configured to set the start threshold to a value that is larger when the surrounding vehicle is not traveling as compared to when the surrounding vehicle is traveling.

* * * * *